United States Patent [19]

Nieminski

[11] 3,892,294
[45] July 1, 1975

[54] DEAD-MAN PARKING BRAKE
[75] Inventor: Robert A. Nieminski, Philadelphia, Pa.
[73] Assignee: Eaton Corporation, Cleveland, Ohio
[22] Filed: Feb. 28, 1974
[21] Appl. No.: 446,999

[52] U.S. Cl. ............... 188/109; 188/167; 180/101; 74/470; 74/483 K
[51] Int. Cl. .......................................... F16d 65/30
[58] Field of Search ................. 188/109, 166, 167; 180/100, 101, 102; 74/529, 470, 483 K

[56] References Cited
UNITED STATES PATENTS

| | | | |
|---|---|---|---|
| 3,259,203 | 7/1966 | Ryskamp | 188/109 |
| 3,664,453 | 5/1972 | Cottrell et al. | 188/109 |
| 3,664,454 | 5/1972 | Cottrell | 188/109 |

FOREIGN PATENTS OR APPLICATIONS

| | | | |
|---|---|---|---|
| 472,079 | 11/1914 | France | 188/109 |

Primary Examiner—Duane A. Reger
Assistant Examiner—Edward R. Kazenske
Attorney, Agent, or Firm—Teagno & Toddy

[57] ABSTRACT

A parking brake system, primarily for industrial vehicles, which applies the brakes automatically when the operator leaves the vehicle and prevents the automatic release of the brakes when the operator reoccupies the vehicle. Release of the brakes must be done manually and this can only be accomplished when the operator's position is occupied. The parking brake can also be applied manually if desired. The system also utilizes a linkage that produces a substantially constant force, regardless of brake wear, that is applied to the braking mechanism.

9 Claims, 5 Drawing Figures

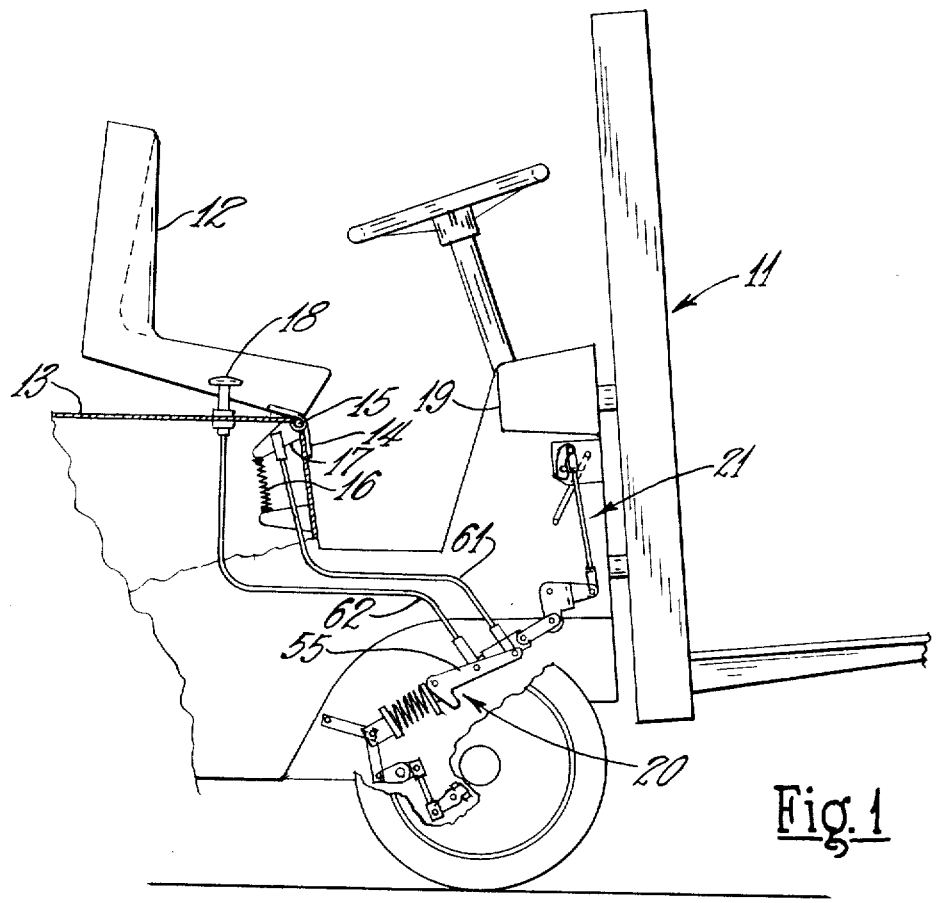

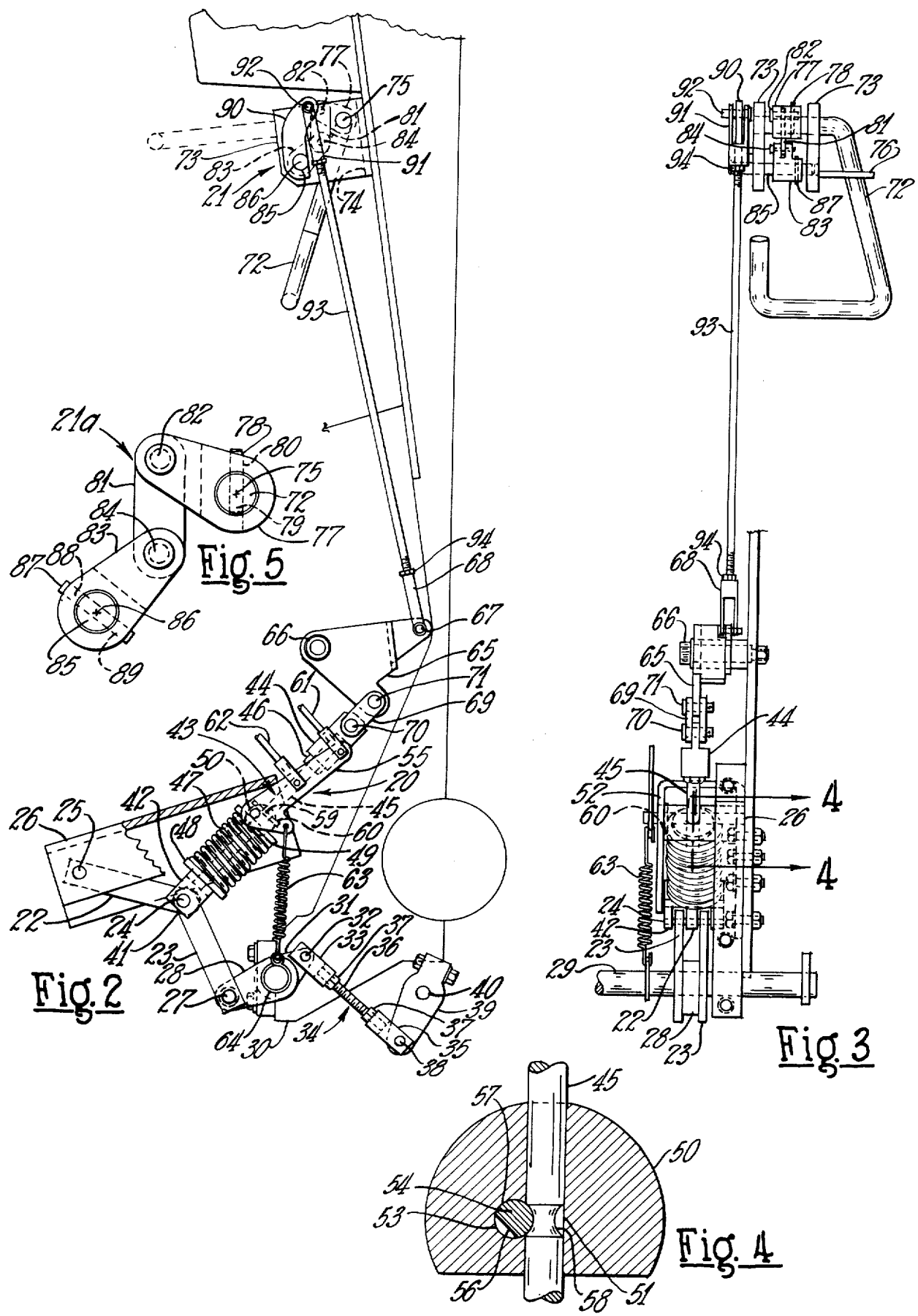

DEAD-MAN PARKING BRAKE

The present invention relates generally to industrial vehicles, and more specifically to a parking brake mechanism which automatically applies the brakes when the operator leaves the vehicle.

One of the safety features that has been available on industrial vehicles is a dead-man braking system. This system automatically applies the vehicle brakes whenever the vehicle seat becomes unoccupied. Thus, the danger of the truck moving while unattended and possibly causing an accident is eliminated. An inherent problem with these dead-man braking systems is that the brakes are automatically released when the operator reoccupies the seat. Thus, if the truck is on an incline, the truck will roll as soon as the operator reoccupies the seat. This is a very unsafe condition since the operator cannot establish complete control of the truck immediately upon reoccupying the seat. In the interim, the truck can roll and cause an accident.

Another disadvantage of present dead-man braking systems is that due to the type of linkage employed, the amount of force applied to the brakes decreases as the brakes wear. Thus, the force applied to the brakes becomes relatively less than the originally designed optimum braking force and periodic adjustment is required to maintain braking efficiency.

The present invention provides a solution to these problems of automatic brake release when the operator reoccupies the vehicle and the decrease in the applied braking force with brake wear. This is accomplished by using a braking linkage that not only provides an essentially constant force to the wheel braking mechanism, but also includes an interlocking means that prevents the automatic release of the brakes when the operator reoccupies the vehicle.

In accordance with the above, the primary object of the invention is to provide an apparatus for the application of the brakes on a vehicle when the operator leaves the vehicle.

Another object of the invention is to provide apparatus whereby the brakes are not released when the operator reoccupies the vehicle.

Another object of the invention is to provide an apparatus whereby the brakes cannot be released until the operator reoccupies an operator's position on the vehicle and actuates a manual release mechanism.

Another object of this invention is to provide apparatus through which the operator can also apply the brakes by manual means.

Another object of this invention is to provide apparatus through which the force applied to the brakes during brake application is maintained substantially constant.

Other objects and advantages of the invention will become more apparent during the course of the following description when taken in connection with the accompanying drawings.

In the drawings, wherein like numerals are employed to designate like parts throughout the same:

FIG. 1 is a side elevation view of a fork lift truck in which the present invention is incorporated with portions of the truck broken away for illustration purposes.

FIG. 2 is an enlarged side elevation view of the brake actuation and brake release assemblies with portions of the brake actuation assembly broken away for illustration purposes.

FIG. 3 is a plan view of the brake actuation and brake release assemblies.

FIG. 4 is an enlarged cross-sectional view taken along section-indicating lines 4—4 of FIG. 3 showing the brake tripping mechanism of the brake actuation assembly.

FIG. 5 is an enlarged view of the linkage associated with the brake release assembly.

Referring now to FIG. 1, the lift truck 11 includes a vehicle seat 12, pivotally mounted on a truck chassis 13 by a hinge 14 having a pivot axis 15. A spring 16 is connected to a lever arm 17 attached to hinge 14 in order to bias the seat 12 so that it is normally at an acute angle with respect to the horizontal. A hand operated brake control 18 is mounted on truck 11 so as to be within the reach of the driver. Also included on truck 11 and mounted beneath the operator's console 19 is a brake actuation assembly 20 and a brake release assembly 21. The braking mechanism at each wheel is of conventional construction and will not be described in detail herein.

BRAKE ACTUATION ASSEMBLY

Referring now to FIGS. 2 and 3, structure of the brake actuation assembly 20 is illustrated in greater detail. In the preferred form of the invention, the assembly includes a toggle joint comprising two arms 22, 23 which are pivotally connected at adjacent ends by a pivot pin 24. Arm 22 is pivotally anchored at its left-hand end by a pivot pin 25 to a linkage frame 26, which is rigidly attached to the vehicle frame. The right-hand end of arm 23 is pivotally connected by a pivot pin 27 to a crank arm 28 which is attached to a cross shaft 29. The cross shaft 29 is positioned parallel to the truck axle and mounted to the truck frame by two mounting trunnions 30 located at each end of the cross shaft. Also attached to cross shaft 29 are two crank arms 31 spaced from and angularly disposed from crank arm 28. The location of each of these two crank arms on cross shaft 29 should be such that they are aligned with the braking mechanism for each wheel. Each of the two crank arms 31 is connected by pivot pin 32 to a yoke end 33 of an adjustable link assembly 34. This assembly includes two yoke ends 33, 35 that are oppositely disposed to one another and are joined by a threaded rod 36. The overall length of the adjustable link assembly 34 can be adjusted to compensate for manufacturing tolerance deviations by turning the threaded rod 36 into the yoke ends 33, 35. When the desired length is attained, jam nuts 37 can be tightened against the yoke ends 33, 35 to insure that the threaded rod 36 will not turn. Yoke end 35 is connected by a pivot pin 38 to a crank arm 39 which when rotated clockwise about a pivot pin 40 actuates the braking mechanism at each wheel in a conventional manner. It can be seen from FIGS. 2 and 3 that when the knee 41 of the toggle joint is moved downward (collapsed position) the brake will be actuated through crank arms 28, 31 and 39 and adjustable link assembly 34.

The knee 41 of the toggle joint is connected by pivot pin 24 to yoke end 42 of a guide rod assembly 43. This assembly includes two yoke ends 42, 44 that are oppositely disposed to one another and are joined by a guide rod 45 which is provided with threaded ends to ease assembly. A jam nut 46 is provided on the threaded portion of guide rod 45 adjacent yoke end 44 to permit tightening the guide rod assembly 43.

Coaxially mounted with respect to the guide rod 45 are a coil spring 47 and washers 48, 49 which are in contact with and disposed on opposite ends of spring 47. Washers 48, 49 have apertures therein to receive guide rod 45 when the rod is received through the bore of spring 47. After receiving guide rod 45, washer 48 is positioned adjacent spring 47 and yoke end 42, whereas washer 49 is positioned adjacent spring 47 and a bearing member 50, described in detail below.

Referring now to FIGS. 2, 3 and 4, it can be seen that bearing member 50 is a cylindrical rod with one flat surface and with a cross-drilled bore 51 therethrough to receive guide rod 45. Bearing member 50 is supported for rotation on its longitudinal axis by frame side members 52 on linkage frame 26. An eccentrically located longitudinal bore 53 through bearing member 50 intersects the periphery of the cross-drilled bore 51. Received within eccentrically located longitudinal bore 53 is a trip rod 54 which is rigidly connected to a trip lever arm 55. Trip rod 54 is a cylindrical rod with a flat surface 56 along its length. The trip lever arm 55 and trip rod 54 are oriented such that when arm 55 is positioned as shown in FIG. 2, the rounded surface 57 of trip rod 54 will protrude into the cross-drilled bore 51 and will engage a complementary semicircular groove or detent 58 provided on the periphery of guide rod 45 so as to prevent longitudinal movement of the guide rod relative to the trip rod 54.

As will be described in detail later, counterclockwise rotation of lever arm 55 results in a similar rotation of trip rod 54 so that the flat surface 56 of the trip rod will be adjacent the intersection of the longitudinal bore 53 and the cross-drilled bore 51. When this occurs, the trip rod 54 will not protrude into the cross-drilled bore 51 and will not engage the detent 58 located on the guide rod 45, thus permitting the guide rod 45 to move longitudinally relative to the trip rod.

Bearing member 50 is also provided with a cross-drilled hole 59 that does not intersect either the cross-drilled bore 51 for the guide rod 45 or the longitudinal bore 53 for the trip rod 54. A pin 60 of sufficient length so that both ends thereof protrude beyond the edges of bearing member 50 is received in the cross-drilled hole 59. Pin 60 prevents longitudinal movement of bearing member 50 in the frame side members 52.

In order to set the brake actuation assembly 20 for operation, the guide rod 45 must be moved longitudinally so as to compress coil spring 47 against bearing member 50 permitting the rounded surface 57 of trip rod 54 to engage the detent 58 located on the surface of guide rod 45 so as to hold spring 47 in a compressed position. Longitudinal movement of guide rod 45 to compress spring 47 causes buckling of the toggle joint which, in turn, causes movement of toggle arm 23. This toggle arm movement results in clockwise rotation of crank arm 28 and crank arm 31 which are attached by cross shaft 29. Clockwise rotation of crank arm 31 causes linear movement of the adjustable link assembly 34 which, in turn, causes counterclockwise rotation of crank arm 39 about pivot pin 40. The direction of rotation of crank arm 39 is such so as to release the wheel braking mechanism attached thereto.

To operate the brake actuation assembly 20, the trip rod lever arm 55 must be rotated so that the rounded surface 57 of trip rod 54 disengages the detent 58 on guide rod 45 and the flat surface 56 of trip rod 54 is oriented adjacent to guide rod 45. This disengagement permits longitudinal movement of guide rod 45 and allows spring 47 to expand which applies a force that collapses knee 41 of the toggle joint. This force is directly proportional to the deflection of spring 47 from its free state. Application of this force to the knee 41 of the toggle joint causes the joint to move to its dead-center position. The force applied to the knee decreases linearly as the spring expands but this decrease is compensated for by the toggle joint so that the force applied by arm 23 to crank arm 28 is substantially constant. Movement of arm 23 as the toggle joint approaches its dead-center causes crank arm 28 to rotate in a counterclockwise direction. Crank arm 31 is also caused to rotate in a counterclockwise direction since it is attached to crank arm 28 by means of cross shaft 29. Counterclockwise rotation of crank arm 31 causes linear movement of adjustable link assembly 34 which, in turn, causes clockwise rotation of crank arm 39 about pivot pin 40 which actuates the wheel braking mechanism attached thereto. The substantially constant force applied by the toggle joint to crank arm 28 is transmitted through the linkage to crank arm 39 so that a substantially constant force is applied to the wheel braking mechanism.

Actuation cables are connected to the trip rod lever arm 55 so that the brakes will be applied when the operator leaves the vehicle seat or if the operator manually actuates the parking brake. Referring to FIGS. 1, 2, 3 and 4, a seat actuation cable 61 connects lever arm 17 located under the operator's seat 12 with the trip rod lever arm 55; whereas a manual actuation cable 62 connects the hand operated brake control 18 with the trip rod lever arm 55. Both cables may be provided with slip links to permit independent or simultaneous actuation. A return spring 63 is connected between trip rod lever arm 55 and spring retainer 64 which, in turn, is connected to cross shaft 29. Spring 63 biases the trip rod lever arm 55 into a position whereby the rounded surface 57 of trip rod 54 engages the detent 58 provided on guide rod 45 preventing longitudinal movement of the guide rod relative to the trip rod 54, thus maintaining the spring 47 in a compressed position.

As illustrated herein, the brakes are actuated by movement of an operator seat or a hand operated brake control; however, it can be appreciated that they may be actuated by other means which define an operator's station on the vehicle, such as by movement of an operator platform on a stand-up rider type vehicle. In such a vehicle, this platform is pivotally mounted on the vehicle and is biased by a spring similar to spring 16 so as to be normally at an acute angle with respect to the horizontal. An actuation cable similar to cable 61 is connected to the underside of the platform and to the trip rod lever arm in a manner similar to that for brake actuation by the operator seat, as discussed in detail herein. While the operator is on the vehicle, the platform is depressed to be in a substantially horizontal position. When the operator vacates the vehicle, the platform rotates about its pivot axis until it is at an acute angle with respect to the horizontal causing movement of the actuation cable attached thereto which, in turn, actuates the brakes in a manner similar to that for operator seat actuation. It should be borne in mind that in addition to the aforementioned methods of brake actuation, other methods will be apparent to those skilled in the art.

The brake actuation assembly 20 is connected to the brake release assembly 21 (to be described in further detail below) by means of a bellcrank 65 which is pivotally anchored to the frame members of the truck 11 by a pivot pin 66. Bellcrank 65 is connected by pivot pin 67 to yoke end 68 associated with the brake release assembly 21 and is also connected to yoke end 44 of guide rod assembly 43 by a link 69 and pivot pins 70 and 71. Bellcrank 65 transmits motion from the brake release assembly 21 to the brake actuation assembly 20.

BRAKE RELEASE ASSEMBLY

Turning now to the brake release assembly 21 shown in FIGS. 2 and 3, and the associated linkage shown in FIG. 5, the release mechanism serves both to release the parking brake after the operator reoccupies the seat, and to reset the brakes for the next brake actuation. The release mechanism essentially comprises a release handle 72 pivotally mounted to the vehicle frame, and a connecting rod 93 connecting the release assembly to the bellcrank 65 through a system of lever arms designated generally by the numeral 21a. Handle 72 is supported by side members 73 attached to a mounting plate 74 attached to the vehicle frame. Handle 72 is allowed to rotate about a first axis 75. A stop pin 76 extending from one of the side members 73 is provided to limit the travel of handle 72. A crank arm 77 is positioned on the portion of handle 72 that is between the side members 73 and is connected to the handle 72 by a pin 78 that is in contact with a shoulder 80 on crank arm 77. Since the only means of connection between the crank arm 77 and the handle 72 is the pin 78 in contact with the shoulder 80, the pin 78 must have a length greater than the diameter of handle 72 so that a portion of pin 78 will protrude beyond the outer surface of the handle after the pin is received in a cross-drilled hole 79 in the handle. To facilitate the proper operation of the handle 72, the pin 78 should be positioned in cross-drilled hole 79 so that the portion of pin 78 that protrudes is its upper end only. It is imperative that the pin 78 and the shoulder 80 are properly aligned to insure that rotation of handle 72 will result in a similar angular displacement of crank arm 77. Crank arm 77 has a yoke-like section to accommodate connecting linkage. A link 81 is received in this yoke-like section and is connected at one end thereof to crank arm 77 by a pivot pin 82. The opposite end of link 81 is received in a similar yoke-like section of a crank arm 83 and is connected to crank arm 83 by a pivot pin 84. Crank arm 83 is received on a shaft 85 which is supported by side members 73 and is allowed to rotate about a second axis 86. Crank arm 83 is connected to shaft 85 by a pin 87 that is in contact with a shoulder 89 on the crank arm. Since the only means of connection between the crank arm 83 and the shaft 85 is the pin 87 in contact with the shoulder 89, the pin 87 must be of sufficient length so that both of its ends will protrude beyond the outer surface of shaft 85 after the pin is received in a cross-drilled hole 88 in the shaft. Alignment of pin 87 with shoulder 89 is necessary to insure that an angular displacement of crank arm 83 will result in a similar angular displacement of shaft 85.

Shaft 85 is of sufficient length so as to have one end thereof protrude through side member 73. The end that protrudes is connected to a crank arm 90 which, in turn, is connected to a yoke end 91 by pivot pin 92. Yoke end 91 is connected to yoke end 68 by a connecting rod 93, thus interconnecting brake release assembly 21 with the brake actuation assembly 20. The ends of connecting rod 93 are threaded so that the proper connecting rod length can be attained, and jam nuts 94 are provided on the ends thereof to permit tightening the connecting rod 93 after the desired length has been attained.

In order to release the brakes, the operator must manually pull up on the brake release handle 72 to a nearly horizontal position moving the handle in a clockwise direction as viewed in FIG. 2. This movement of handle 72 causes crank arm 77 to rotate in a clockwise direction since it is attached to handle 72 by means of pin 78 contacting shoulder 80 of crank arm 77. Through interconnection by link 81, crank arm 83 is caused to rotate in a counterclockwise direction. Since crank arm 83 is attached to shaft 85 by means of pin 87 being in contact with crank arm shoulder 89 and since shaft 85 is connected to crank arm 90, crank arm 90 is caused to rotate in a counterclockwise direction. Through connecting rod 93, bellcrank 65 is caused to rotate about pivot pin 66 in a counterclockwise direction. Since bellcrank 65 is connected to guide rod 45 by link 69, this rotation of bellcrank 65 causes longitudinal movement of guide rod 45 which compresses coil spring 47 against bearing member 50 and buckles the toggle joint. This buckling of the toggle joint, acting through the connecting linkage, results in the release of the braking mechanism at each wheel. When the coil spring 47 is compressed, the round surface 57 of trip rod 54 engages detent 58 located on the surface of the guide rod 45 thus holding the spring 47 in a compressed position and setting the brake actuation assembly 20 for a subsequent actuation.

After the spring 47 has been compressed and the brakes have been released, the handle 72 can return to a position where it will not interfere with the operator and yet will be within his reach, such as a nearly vertical position under the operator's console.

OPERATION

Referring again to FIGS. 1, 2, 3, 4 and 5, consider the typical operation of this braking system. When the operator vacates seat 12, a spring 16 causes the seat to rotate about pivot axis 15 until the seat is at an acute angle with respect to the horizontal. Rotation of seat 12 causes movement of actuation cable 61 which is attached to the seat by means of lever arm 17. Since the other end of actuation cable 61 is connected to trip rod lever arm 55, movement of cable 61 causes the lever arm to be rotated counterclockwise so that rounded surface 57 of trip rod 54 disengages the detent 58 on guide rod 45. This disengagement permits the coil spring 47 to expand forcing the toggle joint to collapse to its dead-center position which, through the connecting linkage, actuates the braking mechanism at each wheel, as was previously explained.

The brakes can also be actuated manually by pulling up on the hand operated brake control 18. This actuation of the brake control 18 causes movement of the actuation cable 62 attached thereto. It can be appreciated that the action of cable 62 on the trip rod lever arm 55 is identical to that produced by seat actuation cable 61.

When the operator gets back onto the truck and sits down on seat 12, seat 12 rotates about its pivot axis 15 so as to be in a horizontal position. This movement of the seat does not release the brakes thus insuring that the truck will not roll if on an incline. In order for the brakes to be released, the operator must manually move the brake release handle 72 in a clockwise direction from a nearly vertical position to a nearly horizontal position. Because of the connecting linkage, this handle movement results in a counterclockwise rotation of crank arm 90 which, in turn, results in a counterclockwise rotation of bellcrank 65. Such rotation of bellcrank 65 results in longitudinal movement of guide rod 45 which compresses coil spring 47 against bearing member 50 and buckles the toggle joint. When the toggle joint buckles, the connecting linkage attached thereto releases the braking mechanism at each wheel. When the coil spring 47 is compressed, the rounded surface 57 of trip rod 54 engages guide rod detent 58 and holds the spring 47 in a compressed position, thus setting the brake actuation assembly 20 for a subsequent actuation.

Thus, the braking system can be actuated manually or by some remote means, such as the operator vacating the vehicle. However, the braking mechanism will not release automatically when the operator reoccupies the vehicle. Release of the brakes must be done manually and this can only be accomplished with the vehicle occupied, thus insuring that the operator has control of the truck before the brakes are released.

I claim:

1. In a vehicle including a braking mechanism associated with one or more wheels of said vehicle an operator's station on said vehicle movable between an occupied position and an unoccupied position, brake linkage means movable between a brake applied position and a brake released position for controlling actuation of said braking mechanism, biasing means operatively connected to said brake linkage means and applying a force tending to move said linkage means to its brake applied position to actuate said braking mechanism to prevent movement of said vehicle, latch means engageable with said brake linkage means to hold said linkage in its brake released position, means operatively connected to said operator's station for releasing said latch means when said operator's station moves toward its unoccupied position permitting said brake linkage means to move toward its brake applied position, and means independent of said operator's station for returning said brake linkage means to its brake released position to release said braking mechanism and for returning said linkage means into position for reengagement by said latch means, said latch means being effective to re-engage said brake linkage means only when said operator's station is in its occupied position.

2. The vehicle as defined in claim 1, wherein said linkage means comprises a toggle joint formed by two arms pivotally connected at adjacent ends thereof and having opposite ends movable away from each other during movement of said toggle joint to its dead-center position, said opposite ends being movable toward each other during buckling movement of said toggle joint, the opposite end of one arm being connected to a frame member while the opposite end of the other arm being operatively connected to said braking mechanism, and said biasing means comprises a spring acting between the knee of said toggle joint and a bearing member located in a fixed position relative to said knee.

3. The vehicle as defined in claim 1, wherein said latch means comprises:
   a bearing member having a cross-drilled bore therethrough and a non-concentric longitudinal bore therethrough so located as to intersect said cross-drilled bore on the outer periphery thereof, said cross-drilled hole receiving a guide rod operatively connected to said linkage means;
   a trip lever assembly including a lever arm with a rod connected thereto, said rod being received in said longitudinal bore in said bearing member and having a portion of its surface engageable with a detent formed on the periphery of said guide rod, said engagement occurring when said lever arm is in a predetermined angular position relative to said guide rod; and
   biasing means operatively connected to said trip lever assembly to maintain said position of said rod in engagement with said detent.

4. The vehicle as defined in claim 1, wherein said means for releasing said latch means comprises:
   a release cable operatively connected at one end thereof to said operator's station, and connected at the other end thereof to said latch means.

5. The vehicle as defined in claim 4, wherein said operator's station is an operator's seat.

6. The vehicle as defined in claim 1, wherein said means for releasing said latch means comprises:
   a manual control lever movably mounted on said vehicle in close proximity to the operator of said vehicle; and
   a release cable operatively connected at one end thereof to said manual control lever, and connected at the other end thereof to said latch means.

7. The vehicle as defined in claim 1, wherein said means for returning said brake linkage means to its brake released position comprises:
   a handle pivotally mounted at one end thereof to the frame of said vehicle;
   return linkage means connected at one end thereof to said handle; and
   connecting rod means connected at one end thereof to the opposite end of said return linkage means and at the opposite end thereof to said brake linkage means.

8. The linkage return means as defined by claim 7, in which said return linkage means includes a lost motion connection to permit placement of said handle in an out-of-the-way position after said brake linkage means is returned to its brake released position.

9. The vehicle as defined in claim 1, in which said brake linkage means includes means to maintain a substantially constant force by said biasing means tending to move said brake linkage means to its brake applied position regardless of changes in said brake applied position due to brake wear.

* * * * *